(12) United States Patent
Kakie (10) Patent No.: US 8,243,101 B2
(45) Date of Patent: Aug. 14, 2012

(54) IMAGE DISPLAY PROCESSING APPARATUS, IMAGE DISPLAY PROCESSING METHOD, AND RECORDING MEDIUM

(75) Inventor: Michito Kakie, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 572 days.

(21) Appl. No.: 12/274,801

(22) Filed: Nov. 20, 2008

(65) Prior Publication Data

US 2009/0219290 A1    Sep. 3, 2009

(30) Foreign Application Priority Data

Feb. 29, 2008    (JP) .................................. 2008-51031

(51) Int. Cl.
*G09G 5/00* (2006.01)

(52) U.S. Cl. ...................................... 345/660; 345/671

(58) Field of Classification Search .................. 345/660, 345/671, 427
See application file for complete search history.

(56) References Cited

U.S. PATENT DOCUMENTS

| | | | |
|---|---|---|---|
| 7,405,736 B2 * | 7/2008 | Wilt et al. ..................... | 345/591 |
| 7,405,739 B2 * | 7/2008 | Gannon ........................ | 345/660 |
| 7,889,212 B2 * | 2/2011 | Schulz et al. ................. | 345/660 |
| 2005/0174457 A1 * | 8/2005 | Yoshino et al. .......... | 348/333.01 |
| 2006/0092181 A1 * | 5/2006 | Park .............................. | 345/660 |
| 2009/0085935 A1 * | 4/2009 | Yamashita et al. ........... | 345/660 |
| 2010/0091105 A1 * | 4/2010 | Watanabe .................... | 348/140 |

FOREIGN PATENT DOCUMENTS

| | | |
|---|---|---|
| JP | 2000-206956 | 7/2000 |
| JP | 2004-280745 | 10/2000 |

* cited by examiner

*Primary Examiner* — Hau Nguyen
*Assistant Examiner* — Leon T Cain, II
(74) *Attorney, Agent, or Firm* — Staas & Halsey LLP (57) ABSTRACT

An image display processing apparatus includes an input-shape detector detecting a shape of a trajectory of a line drawn in the monitor screen; a center-point determiner determining, in a case where the shape of the trajectory of the line is formed of a circular line and an offshoot line extending from the circular line, a center point of a graphic object formed of the circular line; a ratio calculator calculating a distance ratio between a distance from the center point of the graphic object to the circular line and a distance from the center point of the graphic object to an end point of the offshoot line; and an enlargement-ratio changer changing the enlargement ratio of the image on the basis of the distance ratio.

16 Claims, 6 Drawing Sheets

IMAGE DISPLAY PROCESSING APPARATUS, IMAGE DISPLAY PROCESSING METHOD, AND RECORDING MEDIUM

CROSS-REFERENCE TO RELATED APPLICATIONS

This application is related to and claims priority to Japanese Patent Application No. 2008-51031, filed on Feb. 29, 2008 in the Japanese Patent Office, the entire contents of which are incorporated by reference herein.

BACKGROUND OF THE INVENTION

1. Field of the Invention

The present invention relates to image display processing apparatuses, image display processing methods, and image display processing programs. Particularly, the present invention relates to an image display processing apparatus, an image display processing method, and an image display processing program for changing an enlargement ratio of an image displayed on a monitor screen.

2. Description of the Related Art

Recently, a function for performing enlargement or reduction of an image displayed on a screen when viewing the screen has existed to improve ease of viewing. The screen may be on a terminal having a function of displaying information on the screen, such as a personal computer (PC) or a portable device.

Generally, it is possible to enlarge or reduce an image by using an application-specific enlargement or reduction tool of an application being used.

However, enlargement or reduction tools provided in applications are not necessarily convenient in that a large number of operations are required for use, enlargement ratios are fixed, and so forth. This often causes a user to feel a sense of laboriousness.

Particularly, in the case of a portable device, which usually has a screen smaller than that of a PC or the like; it is desired to enlarge a displayed image in many occasions. Therefore, there exists a demand for a simple method of enlarging an image.

The present invention has been made in view of the above, and it is an object thereof to provide an image display processing apparatus, an image display processing method, and an image display processing program with which it is readily possible to enlarge or reduce an image as desired.

SUMMARY OF THE INVENTION

In order to achieve the above object, there is provided an image display processing apparatus that allows changing an enlargement ratio of an image displayed on a monitor screen. The image display processing apparatus includes an input-shape detector detecting a shape of a trajectory of a line drawn in the monitor screen; a center-point determiner determining, in a case where the shape of the trajectory of the line is formed of a circular line and an offshoot line extending from the circular line, a center point of a graphic object formed of the circular line; a ratio calculator calculating a distance ratio between a distance from the center point of the graphic object to the circular line and a distance from the center point of the graphic object to an end point of the offshoot line; and an enlargement-ratio changer changing the enlargement ratio of the image on the basis of the distance ratio calculated by the ratio calculator.

The above-described embodiments of the present invention are intended as examples, and all embodiments of the present invention are not limited to including the features described above.

DETAILED DESCRIPTION OF THE PREFERRED EMBODIMENTS

Reference may now be made in detail to embodiments of the present invention, examples of which are illustrated in the accompanying drawings, wherein like reference numerals refer to like elements throughout.

Now, an embodiment of the present invention will be described in detail with reference to the drawings.

The description will first be directed to an overview of the present invention, and then to an embodiment thereof.

Figure 1:
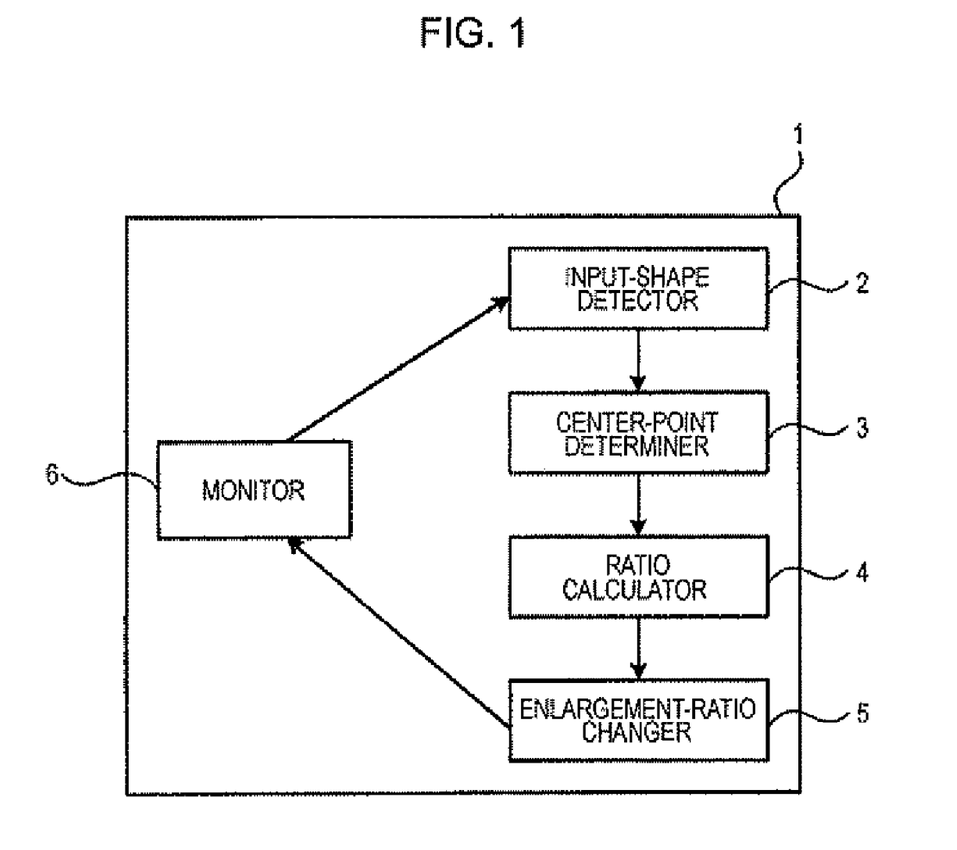
FIG. 1 is a diagram showing an overview of the present invention.

FIG. 1 is a diagram showing an overview of the present invention.

Referring to FIG. 1, a computer 1 (image display processing apparatus) includes input-shape detector 2, center-point determiner 3, ratio calculator 4, and enlargement-ratio changer 5.

The input-shape detector 2 detects the shape of the trajectory of a line drawn in a screen of a monitor 6.

In a case where the shape of the trajectory of the line is formed of a circular line and an offshoot line extending from the circular line, the center-point determiner 3 determines a center point of a graphic object formed of the circular line.

The ratio calculator 4 calculates a distance ratio between the distance from the center point of the graphic object to the circular line and the distance from the center point of the graphic object to the end point of the offshoot line.

The enlargement-ratio changer 5 changes an enlargement ratio of the image on the basis of the distance ratio calculated by the ratio calculator 4.

Accordingly, it is possible to simultaneously determine the center point of the image, whether to enlarge or reduce the image, and the enlargement ratio of the image.

Figure 2:
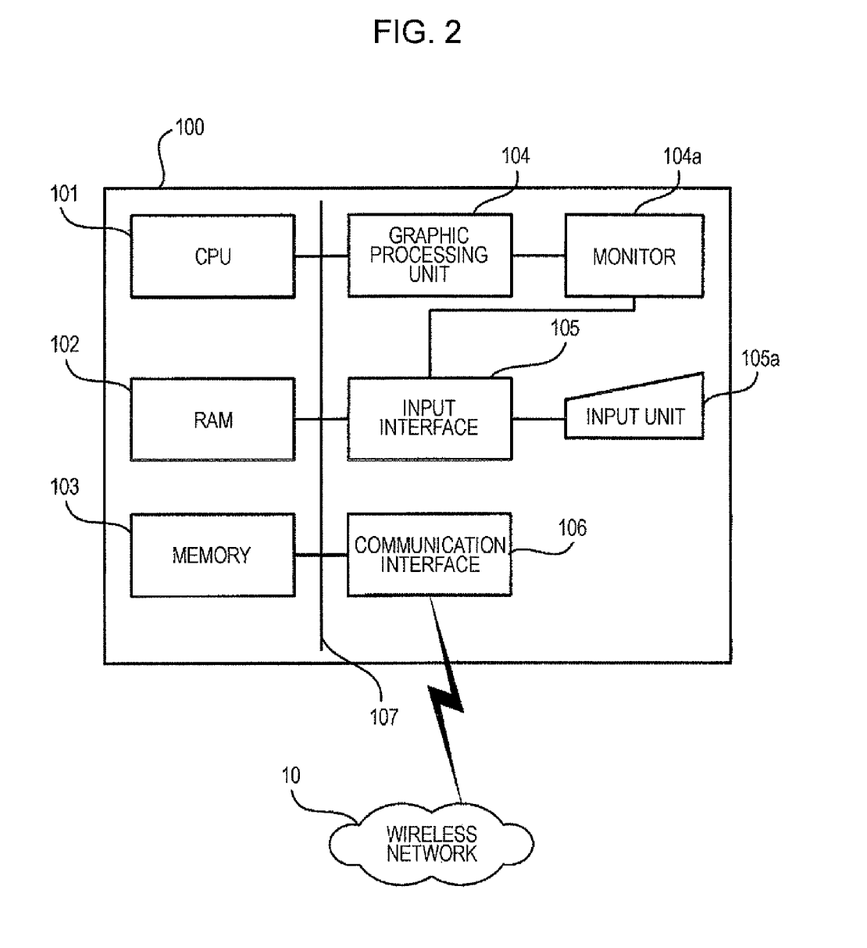
FIG. 2 is a diagram showing an example hardware configuration of a portable device.

FIG. 2 is a diagram showing an example hardware configuration of a portable device.

A portable device 100 as a whole is controlled by a central processing unit (CPU) 101. The CPU 101 is connected via a bus 107 to a random access memory (RAM) 102, a memory 103, a graphic processing unit 104, an input interface 105, and a communication interface 106.

At least part of an operating system (OS) program and application programs executed by the CPU 101 are temporarily stored in the RAM 102. Furthermore, various types of data needed for processing by the CPU 101 are stored in the RAM 102. The OS and application programs are stored in the memory 103. Furthermore, program files are stored in the memory 103.

The graphic processing unit 104 is connected to a monitor 104a. The graphic processing unit 104 causes an image to be displayed on a screen of the monitor 104a according to an instruction from the CPU 101.

A touch panel function is provided on the monitor 104a. When the screen is touched on with a finger or a special pointing device (e.g., a stylus pen), the touched position is detected and a signal representing the touched position is sent to the input interface 105.

The input interface 105 and an input unit 105a including numeric keys, a cross-shaped key, and so forth is connected to the monitor 104a. The input interface 105 sends signals transmitted from the monitor 104a and the input unit 105a to the CPU 101 via the bus 107.

The communication interface 106 is connected to a wireless network 10. The communication interface 106 sends data to and receives data from an exchange (not shown) via the wireless network 10.

Processing functions of this embodiment can be implemented by the hardware configuration described above. The following functions are provided in the portable device 100 having the hardware configuration described above, in order to perform enlargement or reduction of an image displayed on the monitor 104a.

Figure 3:
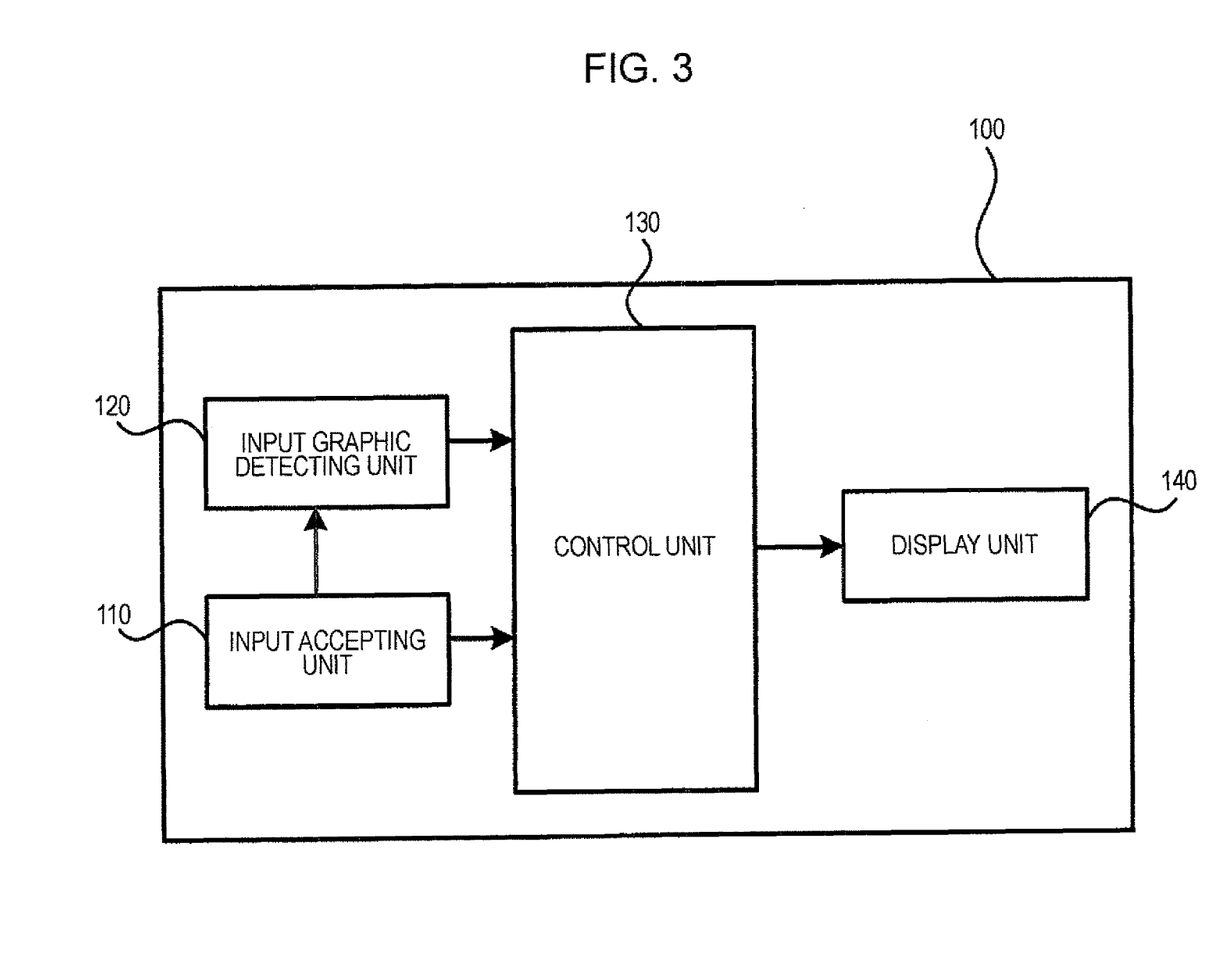
FIG. 3 is a block diagram showing functions of the portable device.

FIG. 3 is a block diagram showing functions of the portable device 100.

The portable device 100 includes an input accepting unit 110, an input graphic detecting unit 120, a control unit 130, and a display unit 140.

The input accepting unit 110 is implemented by a function of the input interface 105. The input accepting unit 110 sends input signals to the input graphic detecting unit 120 and the control unit 130.

The input graphic detecting unit 120 constantly detects graphic features from signals sent from the input accepting unit 110 while the portable device 100 is in operation. The input graphic detecting unit 120 determines center points for enlargement or reduction. The input graphic detecting unit 120 determines whether to perform enlargement or reduction. The input graphic detecting unit 120 determines enlargement ratios (enlargement or reduction ratios). The input graphic detecting unit 120 sends corresponding information to the control unit 130.

The input graphic detecting unit 120 constitutes the main parts of an input-shape detector, a center-point determiner, and a ratio calculator.

The control unit 130 performs start and termination of applications and so forth on the basis of information sent from the input accepting unit 110. Furthermore, the control unit 130 sends an instruction for enlarging or reducing a certain part of an image displayed on the monitor 104a to the display unit 140 upon receiving information from the input graphic detecting unit 120.

The control unit 130 may be configured such that information from the input graphic detecting unit 120 is disregarded while another application (e.g., a text input application) is running. This serves to prevent incorrect operation.

The display unit 140 is implemented by a function of the graphic processing unit 104. The display unit 140 performs enlargement or reduction of a certain part of an image displayed on a screen of the monitor 104a according to an instruction from the controller 130.

Next, an example of a method of enlarging an image will be described.

Figure 4:
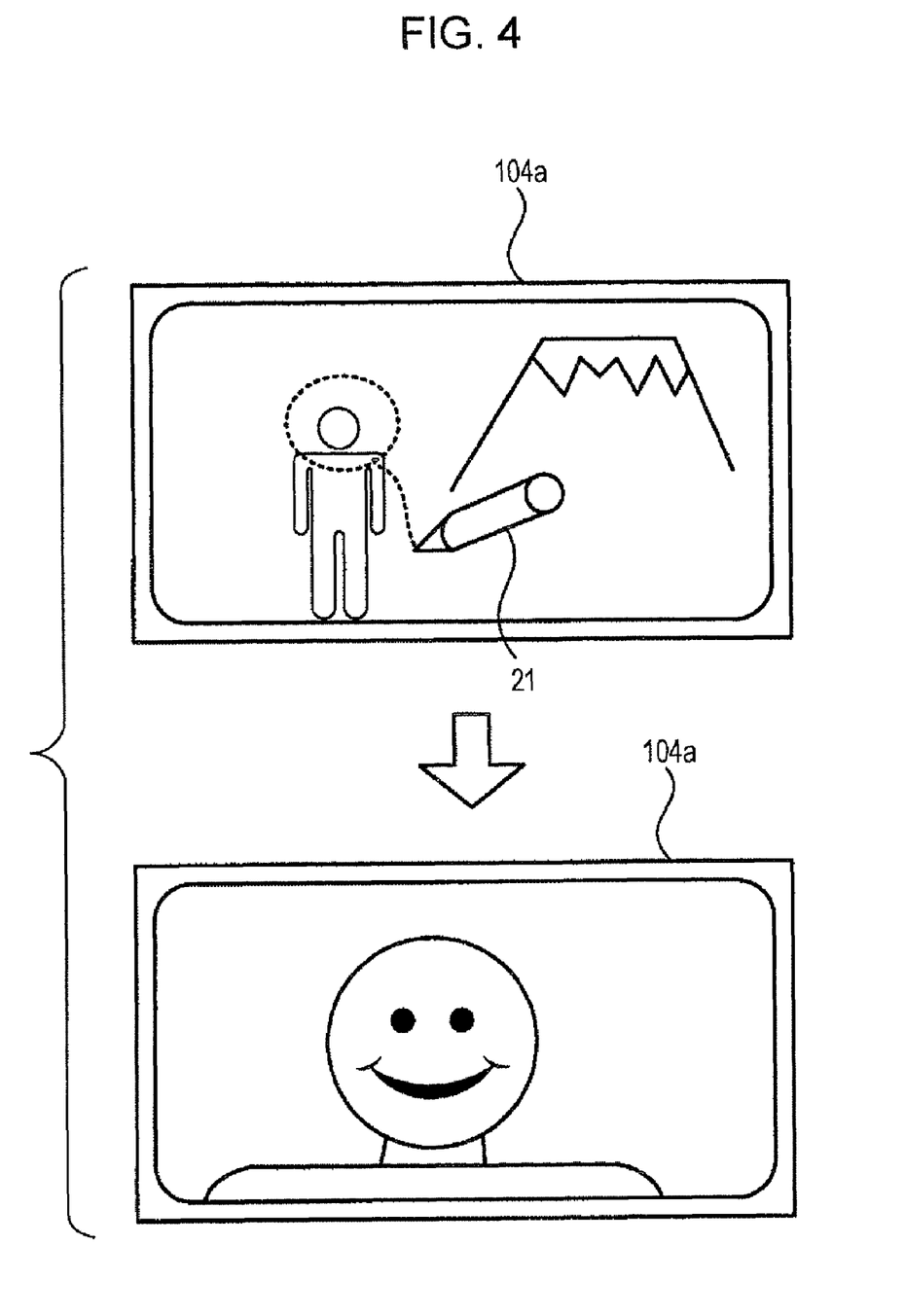
FIG. 4 is a diagram showing an example of a method of enlarging an image.

FIG. 4 is a diagram showing an example of a method of enlarging an image.

First, a user defines a part that the user wishes to enlarge on the screen by drawing a circle around the part with a stylus pen or a cursor. In the case where a stylus pen is used, the user moves the stylus pen on the screen with the tip of the stylus pen kept in contact with the monitor 104a. In the case where a cursor is used, the user moves the cursor on the screen by using the cross-shaped key of the input unit 105a.

As an example of enlarging a face image of a person in the screen by using a stylus pen 21, in the upper part of FIG. 4, the face image is encircled so that the face image is located at the center of the circle.

After making one full round to close the circle, the user draws a line from the point of closure to the outside of the circle. Then, the user withdraws the tip of the stylus pen 21 away from the monitor 104a.

The operation described above is performed unicursally.

Accordingly, an enlarged face image is displayed, as shown in the lower part of FIG. 4.

Although a closed circle is drawn in FIG. 4, the circle need not necessarily be closed. Furthermore, the shape of the circle may be somewhat distorted as long as it makes a circular shape. This point will be described later.

Furthermore, although the line drawn to the outside of the circle is preferably a straight line, the line may be somewhat curved as long as it extends as an offshoot from a part of the circle.

Figure 5:
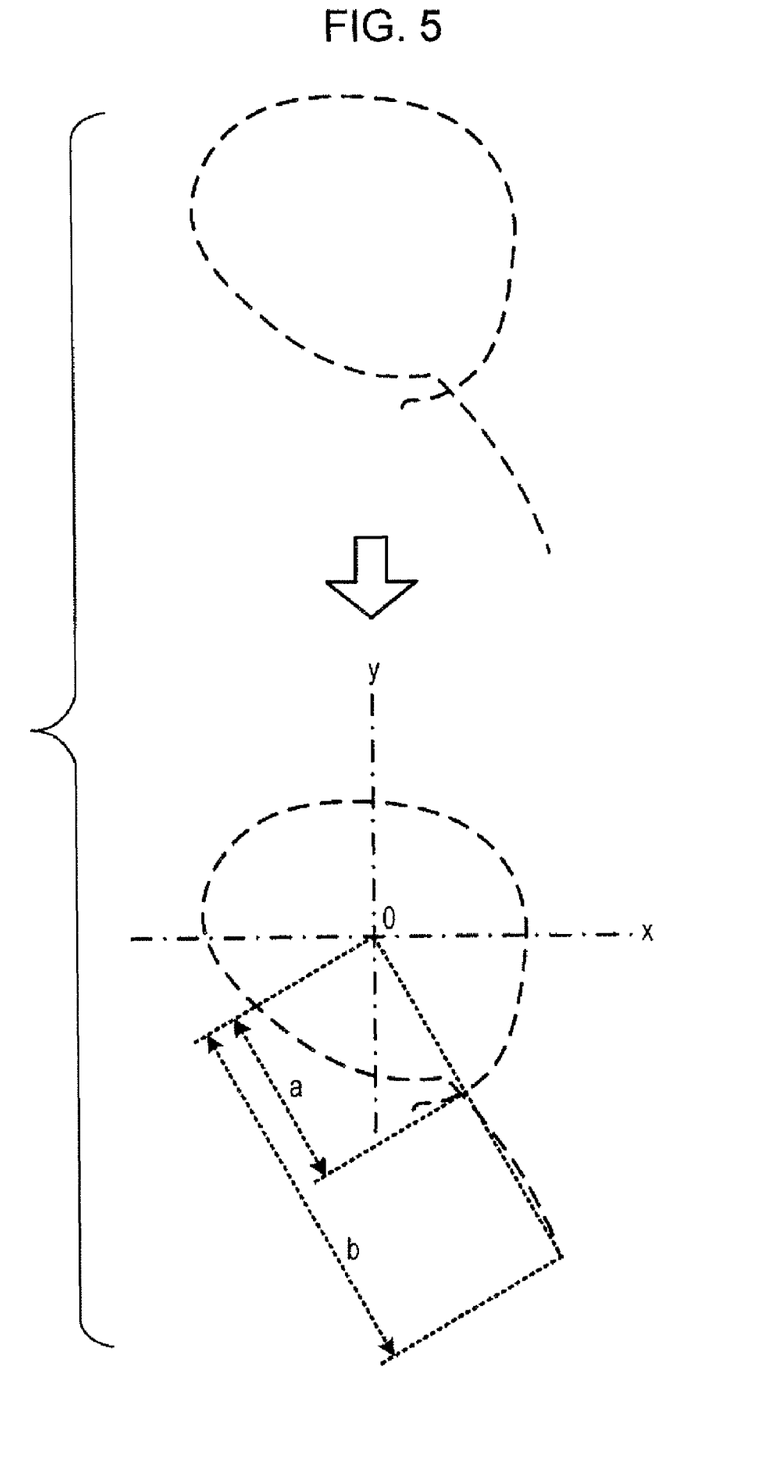
FIG. 5 is a diagram showing an example of a trajectory of a line drawn by a user.

FIG. 5 is a diagram showing an example of the trajectory of a line drawn by the user.

Hereinafter, the horizontal direction of the monitor 104a will be referred to as an x direction, and the vertical direction of the monitor 104a will be referred to as a y direction.

The input graphic detecting unit 120 determines the center of the circle drawn by the user, and defines the center point as a center point for enlargement. Furthermore, the input graphic detecting unit 120 determines the ratio between the radius of the circle and the length b from the center of the circle to the end point of the line drawn to the outside of the circle as an enlargement ratio (=b/a).

The radius of the circle may be determined by an arbitrary method. In this embodiment, in the case where the circle is closed, the radius of the circle is defined as the linear distance between the center of the circle "0" and the point of closure of the circle. In the case where the circle is not closed, the radius of the circle is defined as the linear distance between the center of the circle "0" and the start point of the circle.

The control unit 130 enlarges the image so that the center point for enlargement coincides with the center point of the screen of the monitor 104a (the intersection of diagonal lines).

Although a case of enlarging an image has been described with reference to FIGS. 4 and 5, in a case where an image is to be reduced, the user draws a line to the inside of the circle after drawing a circle. In this case, the enlargement ratio becomes less than one, so that a reduced version of the encircled image is displayed.

As described above, the input graphic detecting unit 120 determines that an image is to be enlarged in the case where a line drawn after drawing a circle is located outside the circle. The input graphic detecting unit 120 determines that an image is to be reduced in the case where a line drawn after drawing a circle is located inside the circle.

Figure 6:
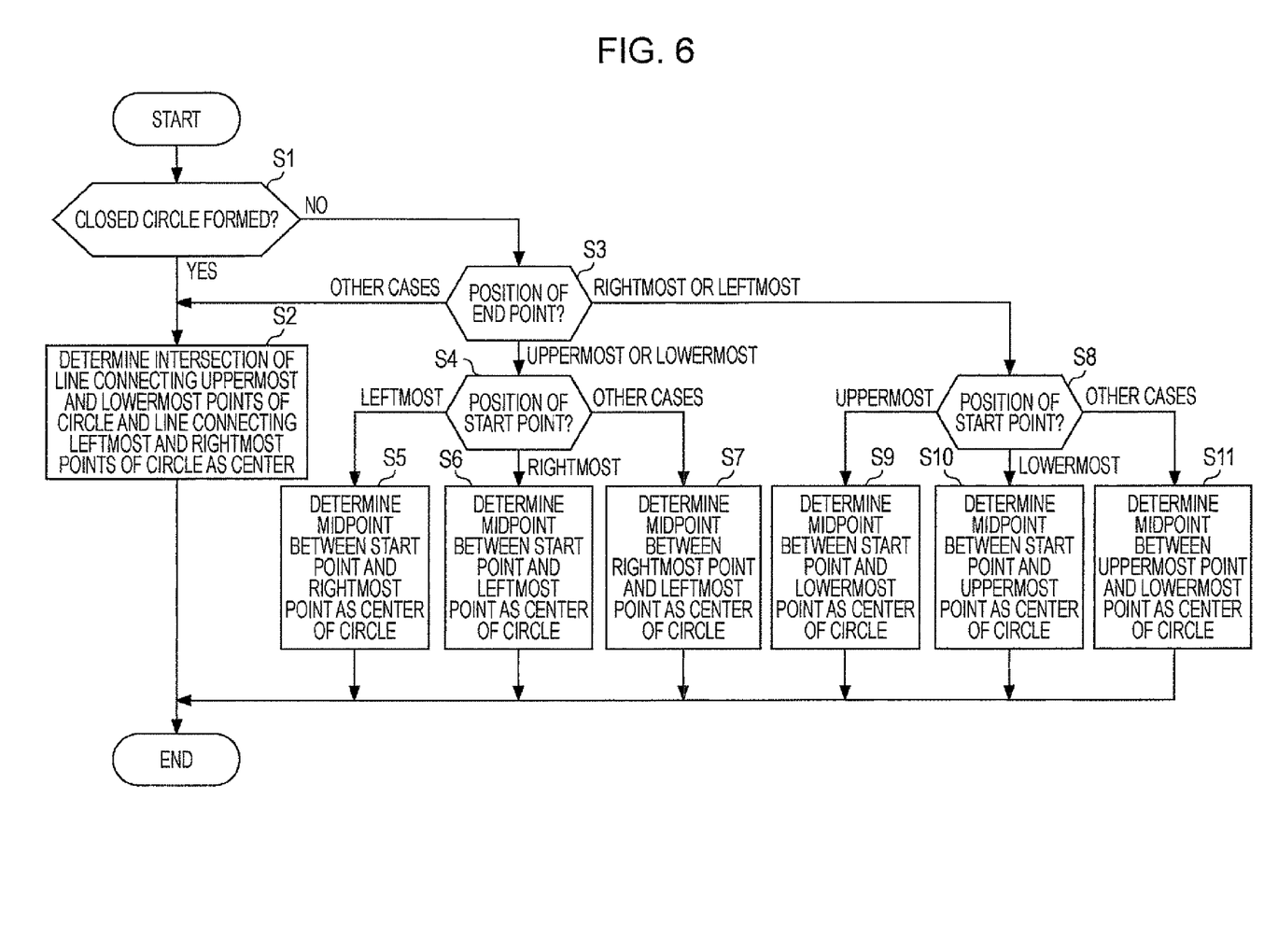
FIG. 6 is a flowchart of a process of determining the center of a circle.

Next, a process in which the input graphic detecting unit 120 determines the center of a circle will be described.

FIG. 6 is a flowchart showing the process of determining the center of a circle.

Hereinafter, a point with a largest y coordinate will be referred to as an "uppermost point", a point with a smallest y coordinate will be referred to as a "lowermost point", a point with a largest x coordinate will be referred to as a "rightmost point", and a point with a smallest x coordinate will be referred to as a "leftmost point". Furthermore, a point of start of drawing is referred to as a "start point", and a point of end of drawing is referred to as an "end point".

First, it is determined whether a closed circle has been formed (operation S1).

If a closed circle has been formed ("YES" in operation S1), the intersection of a line connecting the uppermost and lowermost points of the circle and a line connecting the leftmost and rightmost points of the circle is defined as the center of the circle (operation S2).

If a closed circle has not been formed ("NO" in operation S1), the position of the end point is determined (operation S3).

If the position of the end point is the uppermost point or the lowermost point ("UPPERMOST OR LOWERMOST" in operation S3), the position of the start point is determined (operation S4).

If the position of the start point is the leftmost point ("LEFTMOST" in operation S4), the midpoint between the start point and the rightmost point is defined as the center of the circle (operation S5).

If the position of the start point is the rightmost point ("RIGHTMOST" in operation S4), the midpoint between the start point and the leftmost point is defined as the center of the circle (operation S6).

In other cases ("OTHER CASES" in operation S4), the midpoint between the rightmost point and the leftmost point is defined as the center of the circle (operation S7).

If it is determined in operation S3 that the position of the end point is the rightmost point or the leftmost point ("RIGHTMOST OR LEFTMOST" in operation S3), the position of the start point is determined (operation S8).

If the position of the start point is the uppermost point ("UPPERMOST" in operation S8), the midpoint between the start point and the lowermost point is defined as the center of the circle (operation S9).

If the position of the start point is the lowermost point ("LOWERMOST" in operation S8), the midpoint of the start point and the uppermost point is determined as the center of the circle (operation S10).

In other cases ("OTHER CASES" in operation S8), the midpoint between the uppermost point and the lowermost point is defined as the center of the circle (operation S11).

If it is determined in operation S3 that the position of the end point is a position other than the positions in the above cases ("OTHER CASES" in operation S3), the intersection of the line connecting the uppermost and lowermost points of the circle and the line connecting the leftmost and rightmost points of the circle is defined as the center of the circle (operation S2).

This concludes description of the process of determining the center of a circle.

As described above, with the portable device 100, by unicursally drawing a circular line and an offshoot line extending from the circular line, it is possible to simultaneously perform "selection of a center point for enlargement", "selection of enlargement or reduction", and "selection of an enlargement or reduction ratio". Thus, the user can readily view an image enlarged or reduced by a desired ratio by a simple operation.

Particularly, by using a unicursally drawn line as a subject of processing to simplify the method of writing (input), it is readily possible to view an image enlarged or reduced by a desired ratio even in a situation where the screen shakes, for example, when the user is riding on a train or is walking.

Furthermore, by executing a process of determining the center of a circle, it is possible to determine a center point for enlargement even if a circle is not drawn accurately. Thus, it is readily possible to perform enlargement or reduction of an image as desired.

Furthermore, although the ratio between the radius a of a circle and the length b from the center of the circle to the end of a straight line is used as an enlargement ratio in the embodiment described above, without limitation to the embodiment, for example, the ratio between the radius a of a circle and a value c corresponding to the length of the period of tapping the monitor 104*a* with a pointing device after drawing the circle may be used as an enlargement ratio (=c/a).

Although the embodiment described above is an example of application to a portable device, without limitation to the embodiment, the present invention can be applied to a personal computer (PC) or the like. In this case, a mouse can be used as a pointing device.

Hereinabove, an image display processing apparatus, an image display processing method, and an image display processing program according to the present invention have been described on the basis of the embodiment shown in the drawings. However, the present invention is not limited to the embodiment, and the configuration of each part can be replaced with an arbitrary configuration having a similar function. Furthermore, other arbitrary parts or operations may be added to the present invention.

Furthermore, the present invention may be embodied by combining two or more configurations (features) in the embodiment described above.

The functions for processing described above can be implemented by using a computer. In that case, a program describing processing for functions that the portable device 100 is expected to have is provided. By causing the computer to execute the program, the functions for processing described above are implemented on the computer. The program describing the processing can be recorded on a computer-readable recording medium. As the computer-readable recording medium, for example, a magnetic recording device, an optical disc, a magneto-optical recording medium, or a semiconductor memory may be used. As the magnetic recording device, for example, a hard disk drive (HDD), a flexible disk (FD), or a magnetic tape may be used. As the optical disc, for example, a DVD (digital versatile disc), a DVD-RAM (random access memory), a CD-ROM (compact disc read only memory), or a CD-R (recordable)/RW (rewritable) may be used. As the magneto-optical recording medium, for example, an MO (magneto-optical disk) may be used.

In order to distribute the program, for example, a portable recording medium having the program recorded thereon, such as a DVD or a CD-ROM, is sold. Alternatively, the program may be stored in a storage device of a server computer and transferred from the server computer to another computer via a network.

For example, a computer that executes the image display processing program installs the program recorded on the portable recording medium or transferred from the server computer in a storage device of its own. Then, the computer reads the program from its own storage device and executes processing according to the program. Alternatively, the computer may read the program directly from the portable recording medium and execute processing according to the program. Yet alternatively, the computer may execute processing according to the program received each time the program is transferred from the server computer.

Although a few preferred embodiments of the present invention have been shown and described, it would be appreciated by those skilled in the art that changes may be made in these embodiments without departing from the principles and spirit of the invention, the scope of which is defined in the claims and their equivalents.

What is claimed is:

1. An image display processing apparatus that allows changing an enlargement ratio of an image displayed on a monitor screen, the image display processing apparatus comprising:
   an input-shape detector running on a processor detecting a shape of a trajectory of a line drawn in the monitor screen;
   a center-point determiner determining, in a case where the shape of the trajectory of the line is formed of a circular line and an offshoot line extending from the circular line, a center point of a graphic object formed of the circular line;
   a ratio calculator calculating a distance ratio between a distance from the center point of the graphic object to the circular line in the monitor screen and a distance from the center point of the graphic object to an end point of the offshoot line in the monitor screen; and
   an enlargement-ratio changer changing the enlargement ratio of the image on the basis of the distance ratio.

2. The image display processing apparatus according to claim 1, wherein the circular line and the offshoot line are drawn unicursally.

3. The image display processing apparatus according to claim 1, wherein the enlargement-ratio changer defines the center point so that the center point coincides with a center point of the monitor screen.

4. The image display processing apparatus according to claim 1, wherein, in a case where the circular line is closed, the center-point determiner defines the center point of the graphic object formed of the circular line at an intersection of a line connecting two points of the graphic object that are most separated in a vertical direction of the monitor screen and a line connecting two points of the graphic object that are most separated in a horizontal direction of the monitor screen.

5. The image display processing apparatus according to claim 1, wherein, in a case where the circular line is not closed, the center-point determiner defines the center point of the graphic object on the basis of a start point of drawing of the circular line and an end point of drawing of the offshoot line.

6. An image display processing method for changing an enlargement ratio of an image displayed on a monitor screen, the image display processing method comprising:
   detecting a shape of a trajectory of a line drawn on the monitor screen;
   determining a center point of a graphic object formed of a circular line in a case where the shape of the trajectory of the line is formed of the circular line and an offshoot line extending from the circular line;
   calculating a distance ratio between a distance from the center point of the graphic object to the circular line on the monitor screen and a distance from the center point of the graphic object to an end point of the offshoot line on the monitor screen; and
   changing the enlargement ratio of the image on the basis of the distance ratio.

7. A non-transitory computer-readable recording medium having recorded thereon a program for causing a computer to function so that an enlargement ratio of an image displayed on a monitor screen is changed, the program comprising:
   an input-shape detector detecting a shape of a trajectory of a line drawn in the monitor screen;
   a center-point determiner determining, in a case where the shape of the trajectory of the line is formed of a circular line and an offshoot line extending from the circular line, a center point of a graphic object formed of the circular line;
   a ratio calculator calculating a distance ratio between a distance from the center point of the graphic object to the circular line in the monitor screen and a distance from the center point of the graphic object to an end point of the offshoot line in the monitor screen; and
   an enlargement-ratio changer changing the enlargement ratio of the image on the basis of the distance ratio.

8. The image display processing apparatus according to claim 1, wherein the monitor screen is a touch panel.

9. The image display processing apparatus according to claim 1, wherein, when the circular line is closed, the distance from the center point of the graphic object to the circular line is calculated from the center point to a closed point and, when the circular line is not closed, the distance from the center point of the graphic object to the circular line is calculated from the center point to an start point of the offshoot line.

10. The image display processing apparatus according to claim 1, wherein, when the end point of the offshoot line is located within the circular line, the image is set to be reduced and, when the end point of the offshoot line is not located within the circular line, the image is set to be enlarged.

11. The image display processing method according to claim 6, wherein the monitor screen is a touch panel.

12. The image display processing method according to claim 6, further comprising:
   calculating the distance from the center point of the graphic object to the circular line from the center point to a closed point when the circular line is closed; and
   calculating the distance from the center point of the graphic object to the circular line from the center point to a start point of the offshoot line when the circular line is not closed.

13. The image display processing method according to claim 6, further comprising:
   setting a reduction of the image when the end point of the offshoot line is located within the circular line; and
   setting an enlargement of the image when the end point of the offshoot line is not located within the circular line.

14. The non-transitory computer-readable recording medium according to claim 7, wherein the monitor screen is a touch panel.

15. The non-transitory computer-readable recording medium according to claim 7, wherein, when the circular line is closed, the distance from the center point of the graphic object to the circular line is calculated from the center point to a closed point and, when the circular line is not closed, the distance from the center point of the graphic object to the circular line is calculated from the center point to an start point of the offshoot line.

16. The non-transitory computer-readable recording medium according to claim 7, wherein, when the end point of the offshoot line is located within the circular line, the image is set to be reduced and, when the end point of the offshoot line is not located within the circular line, the image is set to be enlarged.

* * * * *